US012508837B2

United States Patent
Stras et al.

(10) Patent No.: US 12,508,837 B2
(45) Date of Patent: Dec. 30, 2025

(54) HEAT SHIELD CHIN RING

(71) Applicant: Goodrich Corporation, Charlotte, NC (US)

(72) Inventors: Karol Stras, Jelenia Gora (PL); Adam Wyszowski, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 511 days.

(21) Appl. No.: 17/979,599

(22) Filed: Nov. 2, 2022

(65) Prior Publication Data
US 2023/0150303 A1 May 18, 2023

(30) Foreign Application Priority Data
Nov. 17, 2021 (EP) ..................................... 21461620

(51) Int. Cl.
*B60B 7/01* (2006.01)
*B60B 19/10* (2006.01)

(52) U.S. Cl.
CPC ................. *B60B 7/01* (2013.01); *B60B 19/10* (2013.01); *B60B 2360/10* (2013.01); *B60B 2360/36* (2013.01); *B60B 2360/70* (2013.01); *B60B 2900/212* (2013.01); *B60B 2900/513* (2013.01)

(58) Field of Classification Search
CPC .................................. B60B 7/01; B60B 19/10
USPC .............................. 301/6.91, 6.3, 6.2, 37.105
See application file for complete search history.

(56) References Cited

U.S. PATENT DOCUMENTS

| | | | | |
|---|---|---|---|---|
| 1,375,051 A | * | 4/1921 | Lackner | B60B 7/01 301/20 |
| 1,697,307 A | * | 1/1929 | Earnest | B60B 7/00 301/123 |
| 3,003,598 A | | 10/1961 | Sumner et al. | |
| 3,829,162 A | * | 8/1974 | Stimson | B60T 1/065 301/6.5 |
| 4,944,370 A | * | 7/1990 | Chambers | F16D 65/84 188/71.6 |
| 5,186,521 A | * | 2/1993 | Niespodziany | F16D 65/84 188/264 G |
| 5,236,249 A | * | 8/1993 | Han | B60C 23/18 301/6.91 |
| 5,248,013 A | | 9/1993 | Hogue et al. | |

(Continued)

FOREIGN PATENT DOCUMENTS

GB      469803      7/1937

OTHER PUBLICATIONS

EPO, Extended Search Report dated Feb. 17, 2022 with EP Serial No. 21461620.3.

Primary Examiner — Jason R Bellinger
(74) Attorney, Agent, or Firm — SNELL & WILMER L.L.P.

(57) ABSTRACT

A chin ring heat shield for a wheel assembly is provided. The chin ring heat shield is arranged to provide a shield between convection and radiation heat from braking components and a tire of the wheel assembly. The chin ring includes a first, radially extending, flat portion extending from a first chin ring end and a second, concave portion extending generally axially away from the first portion to a second chin ring end. The axial length from the first chin ring end to the second chin ring end is sufficient to block a line of sight between the braking components and the tire when the chin ring is mounted between the braking components and the tire.

9 Claims, 2 Drawing Sheets

(56) References Cited

U.S. PATENT DOCUMENTS

| | | | |
|---|---|---|---|
| 8,523,108 B2 * | 9/2013 | Coty | F16D 55/40 |
| | | | 188/71.6 |
| 8,978,537 B2 * | 3/2015 | Thuman | F41H 7/00 |
| | | | 301/37.105 |
| 11,267,282 B2 * | 3/2022 | Walser | B60C 15/0209 |
| 2018/0335099 A1 | 11/2018 | Bianco et al. | |

* cited by examiner

HEAT SHIELD CHIN RING

CROSS-REFERENCE TO RELATED APPLICATIONS

This application claims priority to, and the benefit of, EP patent application Ser. No. 21/461,620.3, filed Nov. 17, 2021, and titled "HEAT SHIELD CHIN RING," which is incorporated by reference herein in its entirety for all purposes.

FIELD

The present disclosure relates to a heat shield, sometimes referred to as a chin ring for use in a wheel assembly e.g. for an aircraft wheel and brake assembly.

BACKGROUND

Wheels on aircraft and other vehicles are often provided with a brake assembly comprising a stack of brake discs, comprising stators and rotors, mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

The heat energy generated within the braking stators and rotors (forming a heat sink) may dissipate via conduction, radiation and convection to adjacent parts of the brake and wheel assembly including to the tire. Dissipation of heat is required to avoid overheating of the braking components but dissipation of heat to e.g. the tire and other wheel parts can cause damage to those parts. It is important to protect the tire from excessive radiant heat and to protect the heat sink from contaminants such as water, de-icing chemicals and other debris. One way to provide such protection is to provide a heat shield between the heat generating components of the braking system and the adjacent wheel assembly and brake assembly parts.

A chin ring can be used to perform such a function. Conventionally, a chin ring is attached to the wheel assembly so as to block the line of sight between the heat generating parts of the braking system and the tire, to reduce or prevent the radiant heat from the heat generating components reaching and causing damage to the tire.

Various types of heat shield are known but, typically, heat shields are in the form of metal sheets or panels provided concentric with the wheel tube well and spaced a small distance from the tube well. The heat shield can be provided as a single cylindrical piece but more typically is formed as a number of arcuate panels or sections that are attached together to form a complete cylindrical heat shield.

Because the heat shield blocks the convection and radiation heat from the braking components, however, the chin ring itself and the area between the wheel and the heat sink components becomes very hot and these components are crucial for wheel and brake thermal performance.

There is a need for an improved chin ring, from a thermal performance point of view, that also protects the wheel.

SUMMARY

According to one aspect, there is provided a chin ring heat shield for a wheel assembly, arranged to provide a shield between convection and radiation heat from braking components and a tire of the wheel assembly, the chin ring comprising a first, radially extending, flat portion extending from a first chin ring end and a second, concave portion extending generally axially away from the first portion to a second chin ring end, wherein the axial length from the first chin ring end to the second chin ring end is sufficient to block a line of sight between the braking components and the tire when the chin ring is mounted between the braking components and the tire.

According to another aspect, there is provided a wheel assembly including a chin ring as defined above.

BRIEF DESCRIPTION OF THE DRAWINGS

Examples of a chin ring arrangement according to the disclosure will be described with reference to the drawings. It should be noted that variations of the examples described are possible within the scope of the claims.

DETAILED DESCRIPTION

Figures 1, 2:
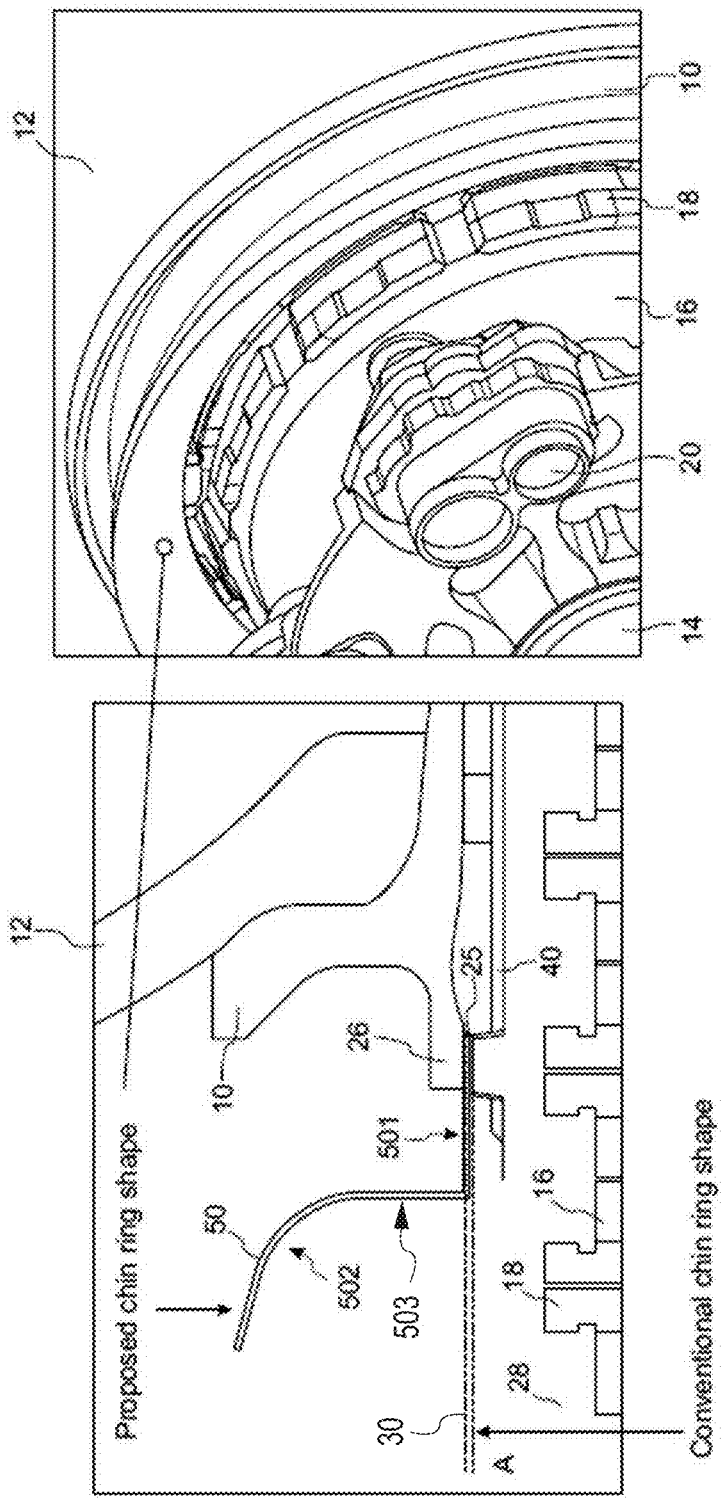
FIG. 1 shows a side sectional view of a chin ring according to the disclosure and for comparison with a conventional chin ring.
FIG. 2 shows a partial view of a wheel assembly incorporating a chin ring according to this disclosure.

Referring first to FIGS. 1 and 2, a wheel assembly includes a wheel flange 10 onto which a tire 12 is mounted. The wheel flange 10 and tire 12 rotate around a wheel axle 14. A braking assembly of a stack of stators and rotors 16, 18 is mounted around the axis A. Pistons 20 cause the stators and rotors to move into frictional engagement when a braking command is applied to the braking assembly, to apply a braking force to the wheel.

As described above, a chin ring (or heat shield) is provided between the braking components 16, 18 and the tire 12 to block radiation and convection heat from reaching the tire from the heat sink components. The axial direction, and direction of movement of the braking components into braking engagement is indicated by arrow A. The dashed lines 30 in FIG. 1 show the shape of a conventional chin ring. The chin ring 30 is in the form of a substantially flat heat absorbent metal plate extending radially outwards from the axis defined by the axle 14. The chin ring 30 is secured between (at 25) the wheel flange 10 and the heat shield 40. Alternatively, the chin ring 30 may be attached to the opposite surface 26 of the wheel or may be secured in a different location but extends radially outwards to provide a shield in the 'line of sight' between the braking assembly heat sink components 16,18 and the tire 12. The conventional chin ring adequately performs the function of preventing or reducing the generated heat being directed to the tire by blocking the convection heat before it reaches the tire. As mentioned above, however, this means that the chin ring 30 itself and the space 28 between the braking components and the chin ring becomes hot and retains heat which can cause damage and safety problems.

The present disclosure provides a modified chin ring 50. All other parts of the wheel and braking assembly are unchanged and are as known in the art. The location of attachment of the chin ring 50 is again shown between (at 25) the wheel flange 10 and the heat shield 40 but the chin ring could be supported at other locations e.g. on the other surface 26 of the wheel flange.

As with the conventional chin ring 30, the modified chin ring 50 extends radially outward (with respect the axle 14) from the wheel flange 10 at a planar, axially extending, portion 501 but is then shaped to form a concave portion 502. The concave portion 502 extends in a substantially axial direction away from the braking components and into a curve generally in the radial direction resulting in a shield that has the concave portion 502 facing away from the tire 12. An intermediate straight portion 503 extends in a radial direction from the planar, axially extending portion 501 and from which the concave portion 502 extends.

Figure 3:
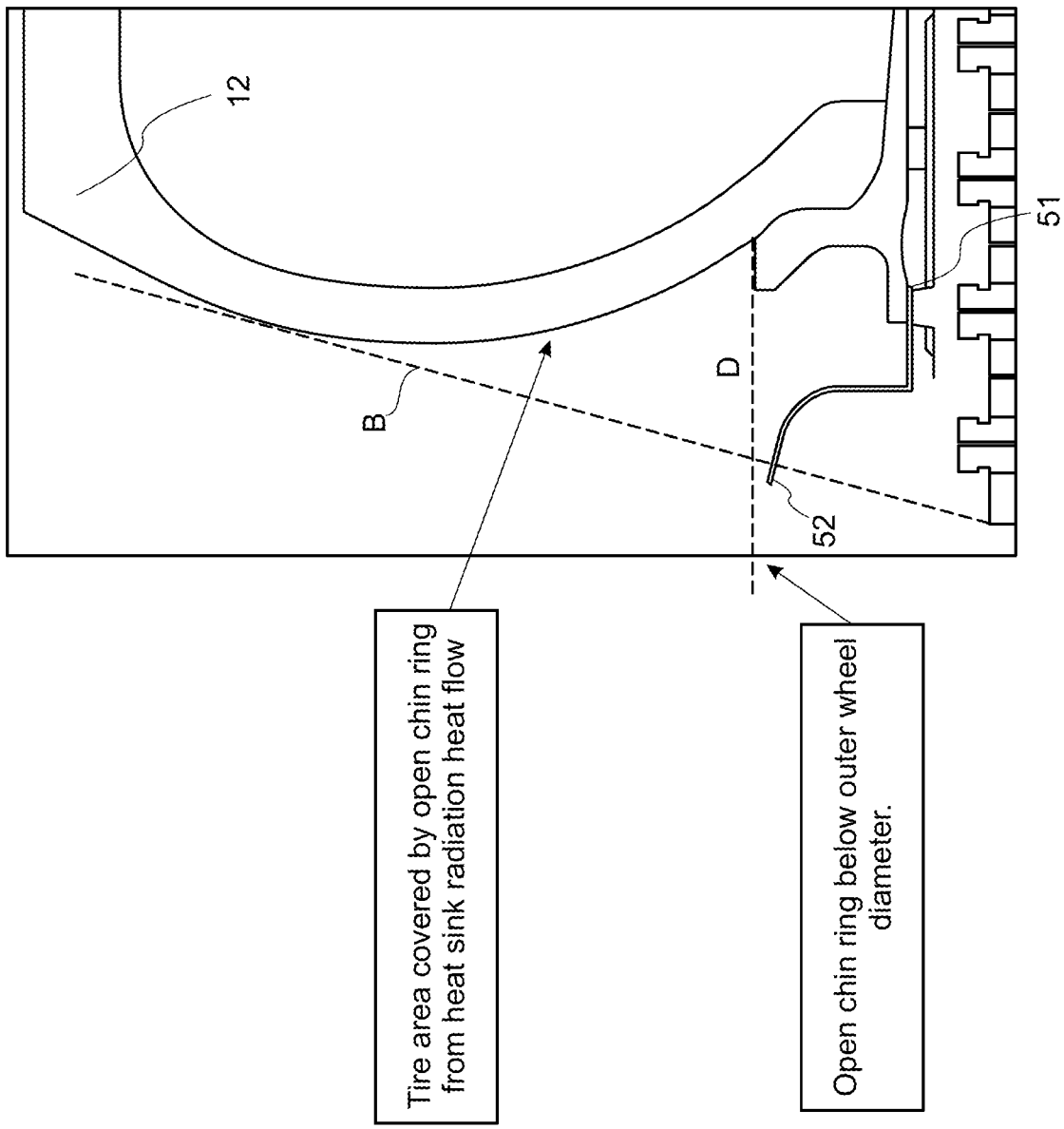
FIG. 3 is shown to explain requirements of the geometry of a chin ring according to the disclosure.

Various curves and dimensions of the first and second portions are possible provided two geometric criteria, shown in FIG. 3, are satisfied: The total chin ring shape must remain below the outer diameter D of the wheel flange 10 and the overall radial extent of the chin ring 50 from the first end 51 attached at the wheel flange 10 to the free, second end 52 should be sufficient to block the line of sight B between the brake components and the tire 12, so that the radiation heat from the heat sink is prevented, by the chin ring 50 from reaching the tire 12.

The concave portion 502 of the chin ring 50 directs the convection heat from the braking components away from the chin ring 50 and the intermediate space 28 to ambient.

The chin ring may be made of any suitable material, such as metal, ceramic or metal/ceramic composites. Stainless steel and aluminum, for example, are suitable metals.

The chin ring can be formed in any suitable manner for working the selected material e.g. by sintering, casting, forging, stamping, laser cutting etc.

To test the effectiveness of the 'open' chin ring 50, temperature probes were attached to various locations of the wheel and the braking assembly in a simulation and it was observed that for heat sink components close to the chin ring area experienced a higher cooling ratio. A higher temperature drop was also observed, with the open chin ring 50 for other parts of the wheel assembly such as the piston housing, the wheel and the axle. A temperature drop compared to the conventional chin ring 30 was also observed on the surface of the tire 12 at various locations. It has been seen, therefore, that the 'open' chin ring design of this disclosure can provide improved thermal performance in a wheel assembly.

By shaping the chin ring with a curve to deflect convection heat away to ambient, but ensuring that the geometrical criteria are satisfied, the chin ring can provide improved thermal performance in a wheel assembly.

What is claimed is:

1. A chin ring heat shield for a wheel assembly arranged to provide a shield between convection and radiation heat from braking components and a wheel of the wheel assembly, the chin ring heat shield comprising:
   a planar, axially extending, portion extending from a first chin ring end;
   a concave portion extending generally axially away from the planar, axially extending, portion to a second chin ring end, wherein an axial length from the first chin ring end to the second chin ring end is sufficient to block a line of sight between the braking components and a tire when the chin ring heat shield is mounted between the braking components and the wheel; and
   an intermediate straight portion extending in a radial direction from the planar, axially extending, portion and from which the concave portion extends, wherein the intermediate straight portion is at an angle of substantially 90 degrees to the planar, axially extending, portion.

2. The chin ring heat shield as claimed in claim 1, made of metal.

3. The chin ring heat shield as claimed in claim 1, made of ceramic.

4. The chin ring heat shield as claimed in claim 1, made of a composite material.

5. A wheel assembly comprising a wheel around an axle, and braking components arranged radially inwards of the wheel, and the chin ring heat shield as claimed in claim 1, mounted between the braking components and the wheel.

6. The wheel assembly as claimed in claim 5, wherein the first chin ring end is secured to a radially inner surface of the wheel.

7. The wheel assembly as claimed in claim 5, further comprising the tire on a radially outer surface of the wheel.

8. The wheel assembly as claimed in claim 5, being a wheel assembly of an aircraft landing gear.

9. A method of dispersing heat generated by braking components of a wheel assembly away from a wheel of the wheel assembly, the method comprising providing the chin ring heat shield as claimed in claim 1 in the line of sight between the braking components and the wheel.

* * * * *